March 21, 1939. G. W. ELSEY ET AL 2,151,378
WELDING APPARATUS
Filed Aug. 23, 1937 6 Sheets-Sheet 3

INVENTORS
George W. Elsey,
Charles F. Wittlinger.
Spencer, Hardman & Fehr
their ATTORNEYS March 21, 1939.  G. W. ELSEY ET AL  2,151,378
WELDING APPARATUS
Filed Aug. 23, 1937   6 Sheets-Sheet 5

INVENTORS
*George W. Elsey.*
*Charles F. Wittlinger.*
*Spencer, Hardman & Fehr*
their ATTORNEYS

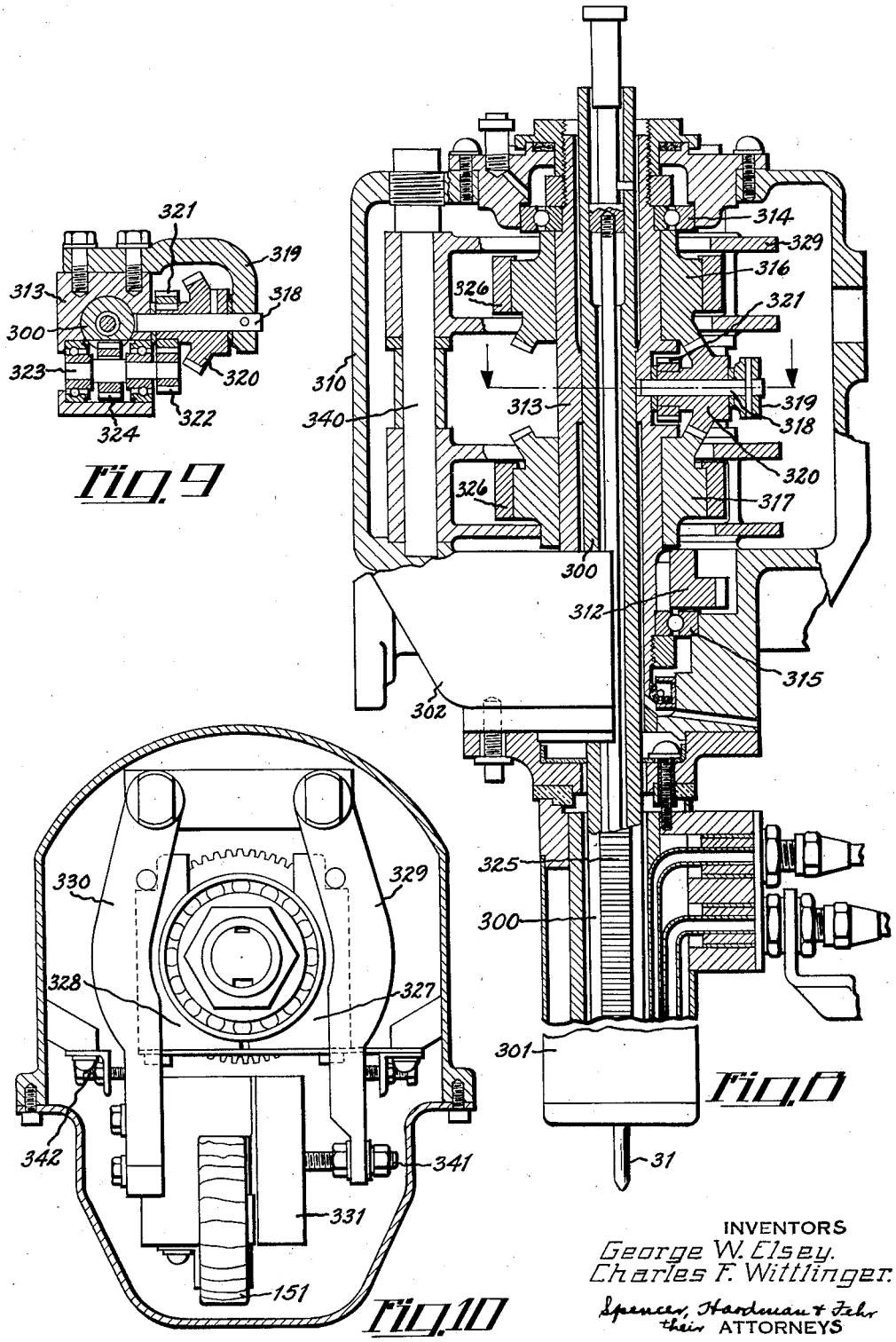

Patented Mar. 21, 1939

2,151,378

UNITED STATES PATENT OFFICE 2,151,378

WELDING APPARATUS

George W. Elsey, La Grange, Ill., and Charles F. Wittlinger, Dayton, Ohio, assignors to General Motors Corporation, Detroit, Mich., a corporation of Delaware Application August 23, 1937, Serial No. 160,436

25 Claims. (Cl. 219—8)

This invention relates to improvements in welding mechanism and more particularly to electrical control means for automatically controlling the welding current upon a rotatable piece of work to be welded which provides a part of the conducting path for the welding current.

One of the objects of the present invention is to provide welding apparatus for mechanism to form a continuous end ring for squirrel cage rotors using bent over bar or conductor ends wherein the ends of the bars or conductors will be of uniform construction and free of irregularities, especially at the start and finish of the weld which would cause unbalance of the rotor and localized places of high resistance in the end ring cross section. The present welding mechanism is used in the manufacture of squirrel cage rotors according to the method disclosed in the copending application of George W. Elsey, Serial No. 85,321, filed June 15, 1936.

Another object of the invention is to perfect the control of a welding apparatus by which end rings for squirrel cage rotors can be built up by electric welding without burning the juncture or overlap of the start and end weld.

Another object of the invention is to provide a welding apparatus in which the welding current is automatically controlled by a series of electrical switches and the apparatus is automatically stopped on the completion of the welding operation.

Another object of the present invention is to control the fluid molten copper so that when it solidifies it has the proper shape and position on the end of the rotor to give the required electrical characteristics.

The above objects are accomplished by providing an automatic control for welding apparatus which among other objects has the following features; electrically controlled switches for completing the welding circuit; electrical means responsive, after a predetermined length of time, upon completion of the welding circuit to close a circuit to a motor for rotating the work to be welded at a uniform speed for 360°; and a series of cam controlled switches, said switches being actuated in proper sequence at the completion of the welding operation one of the switches being actuated to alter the motor circuit, after the work has been rotated 360°, whereby the speeds of the motor and the work are increased, to prevent the welding arc from burning the weld which was performed at the start of the welding cycle, another switch for opening the welding circuit slightly beyond the welding starting point, and another switch for "plugging" the motor circuit shortly after the welding circuit has been broken to stop the motor.

Further the above objects are accomplished by rotating the rotor in a direction so that the bent over ends of the copper conductors enter the high temperature arc first and by providing a cold copper form in the center of the rotor and rotating the rotor at the proper angle with respect to the electrode so the impingement of the electrode stream forces the molten metal against the cold copper form together with gravity, due to the angle the rotor is supported and the location of the arc, the wire is melted as it is moving upward so that as the wire melts it runs toward the copper form.

Further objects and advantages of the present invention will be apparent from the following description, reference being had to the accompanying drawings wherein a preferred embodiment of the present invention is clearly shown.

In the drawings:

Fig. 8 is a part section, a part elevation of the welding head used with the present invention.

Fig. 9 is a sectional view taken on the line 9—9 of Fig. 8.

Fig. 10 is a plan view of a portion of the apparatus illustrated in Fig. 9.

Figure 1:
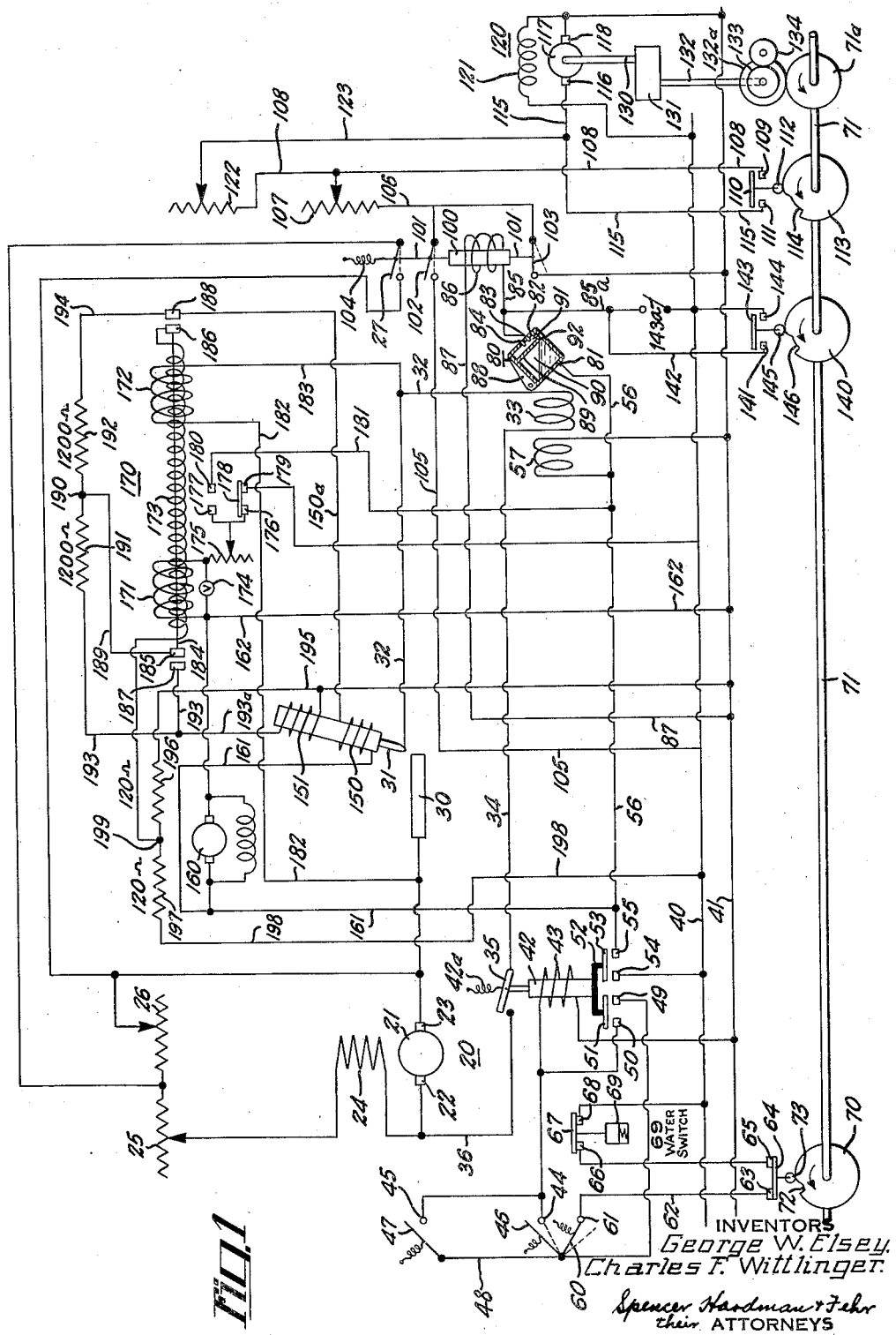
Fig. 1 is a wiring diagram of the electrical connection employed in connection with the welding apparatus.

Referring to Fig. 1 which is a wiring diagram illustrating the electric circuit of the present invention, 20 designates a welding generator for supplying current at roughly 32 volts and 200 amperes. Generator 20 is driven in any suitable manner, such as by an A. C. motor, not shown. Generator 20 comprises an armature 21 connected through commutator brushes 22 and 23, having a field winding 24. Variable resistances 25 and 26 are connected in series, and are connected, respectively, with brushes 22 and 23. The variable resistance 26 is adapted to be short circuited by a switch 27, which is controlled automatically in a manner to be described.

Figure 5:
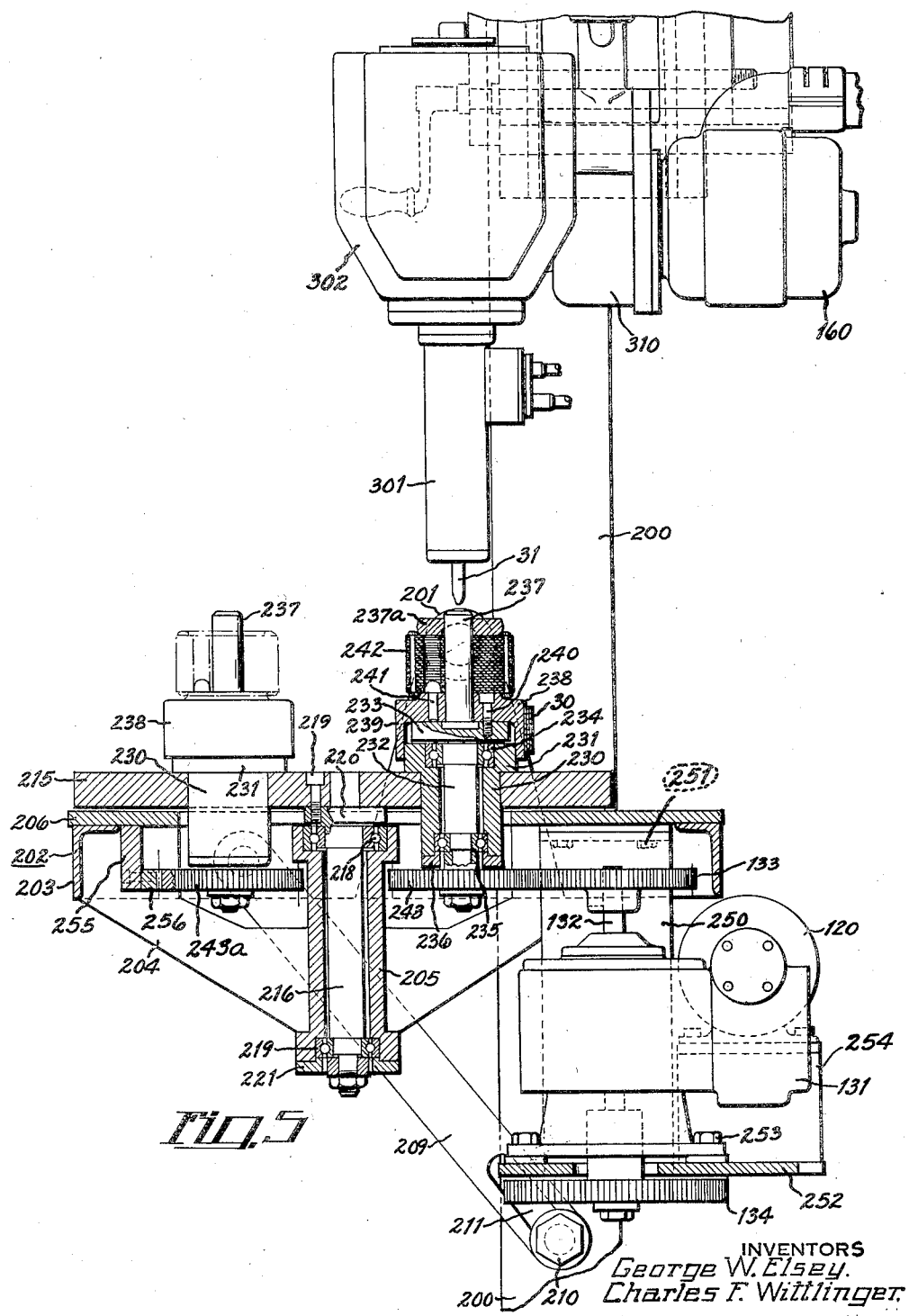
Fig. 5 is a fragmentary side view of the welding head and a sectional view of the work table taken substantially on the line 5—5 of Fig. 3.
Figure 6:
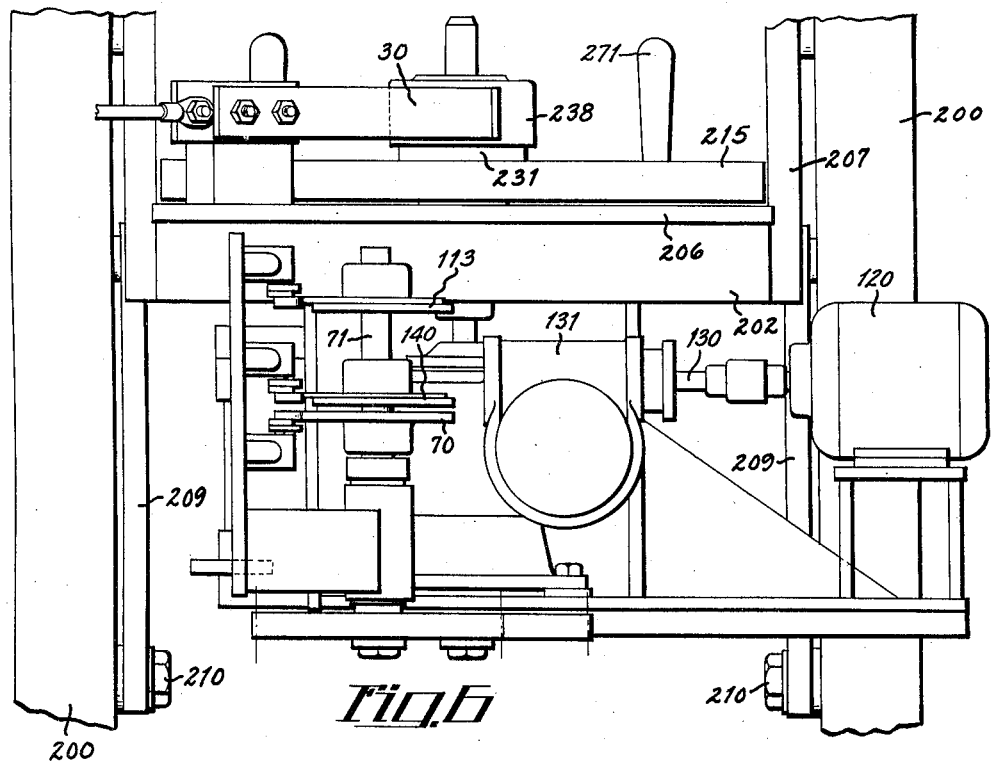
Fig. 6 is an end elevational view of the control mechanism embodying the present invention.

The welding circuit comprises armature 21, brush 23, a brush 30, which bears against the work-holder 238, shown in Fig. 5, electrode 31, wire 32 which connects the electrode with magnet coil 33, wire 34, switch 35, wire 36 and brush 22. It will be understood that the work-holder to which the brush 30 is electrically connected carries the welding current and the work itself provides part of the electrical path to the electrode 31; and the arc or stream which is formed between the work and the electrode 31 is also a part of the conducting path for the welding current. The switch 35 is closed automatically by an electromagnet relay 43 which is energized upon the closing of the suitable switch to conduct current flowing from line wires 40 and 41 connected with a source of direct current at 110 volts. The switch 35 is connected with a solenoid armature 42 energized by magnet winding 43 which is connected with wire 41 and also with either of the switch contacts 44 and 45. Contacts 44 and 45 may be engaged, respectively, by movable switch contacts 46 and 47, which are connected by wire 48 with a contact 49. Contact 49 is connected with a contact 50 by a movable contact 51 which is insulatingly supported by the armature 42 by non-conducting member 52, which also insulatingly supports a contact 53 for bridging a contact 54, connected with line wire 40, with a contact 55. Contact 55 is connected by a wire 56 with magnet coil 57 connected with wire 41. Wire 48 is connected by normally closed switch 60 with a contact 61, connected by wire 62, with a contact 63. Contact 63 is bridged by contact 64 with a contact 65, connected with a contact 66 bridged by contact 67 with a contact 68 connected with line wire 40. Contact 64 is actuated by a cam 70 carried by a camshaft 71. Cam 70 is provided with a notch 72 which receives a roller 73 connected with the bridging contact 64. In a certain position of the cam 70, the switch contact 64 drops into open position.

The switch contact 67 is in open position when the apparatus is not in use. It is closed by the flow of water to the welding electrode for cooling purposes. This mechanism is indicated diagrammatically by numeral 69 and by the legend "Water switch". As the construction of the water switch does not of itself form a part of the invention, it will not be described in detail. It is sufficient to state that the device includes a spring which urges the switch 67 to open position and a collapsible chamber, such as a Sylphon bellows, for receiving water under pressure thereby causing the bellows to move the contact 67 into engagement with contacts 66 and 68.

Magnet coils 33 and 57 control the operation of the mercury switch, designated as a whole by numeral 80. This switch includes terminals 81, 82, 83 and 84 suitably supported in a housing 88 having a partition 89 dividing the housing into compartments 90 and 91. The partition has an orifice 92 through which the mercury passes from one compartment to the other. Normally the mercury is within the compartment 90. Wire 56 is connected with terminal 81. A wire 85 may be connected with either of the terminals 82, 83 and 84. When the mercury switch 80 is caused to tip under the influence of the magnet coils 33 and 57, mercury flows out of the orifice 92 in such a manner as to cause terminal 81 to be connected successively with terminals 82, 83, 84. The rate at which the mercury flows is controlled by the orifice so that it will require approximately one second for the mercury to flow in order that terminal 81 will be connected with terminal 84. Since wire 85 is connected with terminal 83, it will require two-thirds second to bridge the gap between wire 56 and wire 85. Wire 85 is connected with the magnet coil 86 which is connected by wire 87 with line wire 41.

Magnet 86 attracts armature 100 connected by a rod 101 with switch contact 27, switch contact 102 and switch contact 103. Contacts 27 and 102 are normally open; and contact 103 is normally closed. The armature 100 is held in its normal position by a spring 104. As stated before, switch 27 controls the short circuiting of variable resistance 26 which controls the current flowing in generator shunt field circuit 24. Switch 102 controls the connection between a wire 105, connected with line wire 40, and wire 106, connected with a variable resistance 107 which in turn is connected with a wire 108.

Wire 108 is connected with switch contact 109 adapted to be bridged by contact 110 with a contact 111. Contact 110 is held normally in circuit open position by roller 112 which follows a cam 113 driven by shaft 71. Roller 112 is connected with the contact 110 so that when the notch 114 of the cam 113 comes opposite the roller 112 the roller will drop down thereby causing the contact 110 to move into engagement with contacts 109 and 111. Contact 111 is connected by wire 115 with brush 116 of an electric motor 120. The motor 120 has an armature 117 and a brush 118 which is connected with line wire 41. The motor 120 has a field winding 121 connected with line wires 40 and 41.

Switch 103, which is caused to be open during the welding cycle, is automatically closed at the end of the welding cycle for the purpose of "plugging" the armature 117 of the motor 120, that is, to bring the armature 117 quickly to rest. This is accomplished by connecting the brushes 116 and 118 to the same side of the line, that is, to the wire 41. When switch 103 is closed, wire 106 is connected with wire 108 and through a variable resistance 122 with wire 123, wire 115 and brush 116. The other brush 118 is at all times connected with the line wire 41.

The variable resistance 122 is normally open circuited during the running of the machine, but toward the end of a welding cycle it is short-circuited in order to increase the speed of the motor 120 for a purpose to be described. The short-circuiting of the variable resistance 122 is accomplished by providing the cam 113 with a relatively wide notch 114. Hence, the roller 112 will drop into the notch 114 a substantial period before the end of the welding time.

Figure 3:
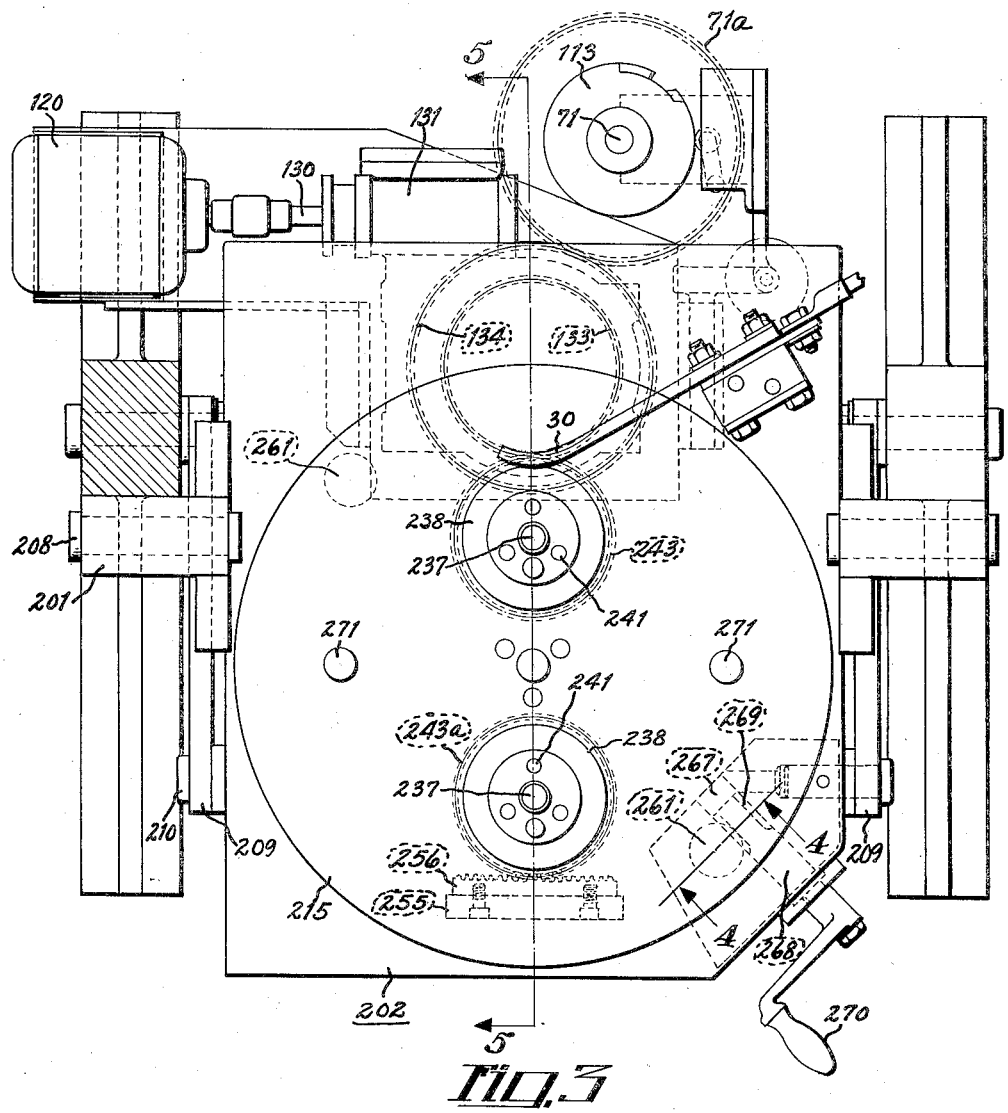
Fig. 3 is a plan view of the work table looking in direction of arrow 3 of Fig. 2.

The armature 117 of the motor 120 drives a shaft 130 connected by a gear reduction 131 with a shaft 132 connected by gears 134 and 71a with shaft 71 see Fig. 3. Gears 134 and 71a have the same pitch diameter. The motor 120 also rotates the rotatable work-holder 238 which supports the rotor whose conductors are to be welded together. The work-holder is driven by a shaft 232 carrying a gear 243 which meshes with a gear 133 driven by shaft 132. Since it is necessary that the work-holder rotate more than one complete revolution during each cycle, the gear 133 is larger than the gear 243. Gear 133 has preferably 65 teeth and gear 243 has 58 teeth. Since the cams 70 and 113 must rotate once during each cycle the shaft 71 must make only one revolution; but the gear 243 will rotate a fraction over one revolution in order that the end portion of the weld will overlap slightly the start portion.

Since certain functions of the system must cease before the end of the cycle, but the work-turning motor must continue to operate until the normal or home position of the camshaft 71 is reached, it is necessary to provide a reset cam 140 which operates to continue the operation of the motor 120 after the welding current is cut off. The welding current is cut off when the cam-operated switch, parts 63, 64 and 65 are open. In advance of the opening of this switch, cam 140 permits the closing of another switch which permits the motor 120 to keep on operating until the home position is reached. This other switch comprises a contact 141 connected by a wire 142 with wire 85a, bridging contact 143 and a contact 144 connected with line wire 40. Contact 143 is connected with a roller 145 which bears on the periphery of cam 140 but which will drop into a notch 146 at some time prior to the opening of the switch 63, 64, 65.

An auxiliary switch 143a is provided and is closed manually. This switch is connected between line wire 40 and solenoid 86. The purpose of this switch is to close the circuit to the motor 120 to operate the motor so as to turn the work in any desired position. This switch is used only in case it is necessary to turn the rotor to a given position to reweld a small defective place in the end ring. When the switch 143a is manually closed the solenoid 86 is connected with the line wires 40 and 41 through the following circuit: wire 40, switch 143a, wire 85a, wire 85, magnet coil 86, wire 87 and wire 41. The energized magnet coil causes the armature 100 to move downwardly, as viewed in Fig. 1, thereby causing the switch 102 to be closed and the following circuit is completed; line wire 40, wire 105, switch 102, wire 106, resistance 107, wire 108, resistance 122, wire 123, wire 115, brush 116, brush 118 to line wire 41.

The operation of the apparatus with respect to the control of the welding cycle will now be described. All switches are shown in their normal positions. The operator closes either of the switches 46 or 47 which are conveniently located near the apparatus. If water for cooling the welding head has been turned on the switch 67 will be closed. Switch 64 is normally closed by cam 70. Therefore, when either of the switches 46 or 47 are closed, current will flow from line 40 through water switch 67 to cam switch 64 to switch 46, relay magnet 43 and back to line wire 41. This will cause the solenoid 42 to move downwardly thereby causing switch 51 to engage contacts 49 and 50 which short circuits the switch 46 thereby making it unnecessary for the operator to hold that switch closed. The relay magnet 43 remaining energized, the armature 42 will be held down and will stay down until either the water switch 67 opens or the cam-operated switch 64 opens.

The downward movement of the armature 42 causes the switch 35 to be closed thereby completing the welding current circuit which is completed by the engagement of the electrode 31 with the work to which the brush 30 is connected. By an electrode feed mechanism, to be described, the electrode 31 is withdrawn from the work thereby drawing an arc which maintains the welding circuit. Magnet coil 33 is in this welding circuit.

The downward movement of the armature 42 causes contact 53 to engage contacts 54 and 55 thereby connecting magnet coil 57 with the wires 40 and 41. The magnet coils 57 and 33 operate together to cause the mercury switch 80 to be tripped, thereby causing mercury to flow through an orifice 92. After about two-thirds second the wire 56 is connected with the wire 85 and the magnet coil 86 is connected with the line wires 40 and 41 through the following circuit: wire 40, contact 54, contact 53, contact 55, wire 56, mercury switch 80, wire 85, magnet coil 86, wire 87, line wire 41. The energized magnet coil 86 causes the armature 100 to move downwardly thereby causing switch 27 to be closed, thereby short circuiting the variable resistance 26, which causes the field excitation of the generator 20 to be increased and the amperage of the welding current to be increased. Concurrently with the closing of switch 27, the switch 102 is closed and the switch 103 is opened, thereby causing the work-table operating motor 120 to rotate. The circuit of the motor 120 is as follows: wire 40, wire 105, switch 102, wire 106, variable resistances 107 and 122, wire 123, wire 115, brush 116, armature 117, brush 118, wire 41. The work-table is therefore rotated and continues to rotate for one complete revolution and a fraction thereover, causing the welding to be entirely completed and the work to be rotated slightly beyond its start position as the welding current is dying off.

Before the end of the cycle of the operation of the apparatus, the cam 70 is rotated until its notch 72 comes opposite the spring pressed roller 73 thereby permitting the switch 64 to open, whereupon the relay switch magnet 43 is deenergized and a spring 42a pulls the armature 42 upwardly to open the switch 35 thereby cutting off the welding current and thereby opening the switches 51 and 53. When this occurs both the magnet coils 33 and 57, which control the mercury switch 80, are deenergized thereby causing said switch 80 to flip to its normal position whereupon the mercury is restored to its initial position and the bridge between wires 56 and 85 is interrupted. When this occurs the circuit previously established to the relay magnet 86 would be interrupted and the motor 120 would stop were it not for the fact that previous to the opening of the switch 64 the cam-operated switch 143 is permitted to be closed due to the fact that the cam 140 permits switch contact 143 to drop ahead of the dropping of switch contact 64 associated with cam 70. The dropping of the contact 143 bridges contacts 141 and 144 by thereby connecting the magnet 86 through the following circuit: wire 40, contact 144, contact 143, contact 141, wire 142, wire 85, magnet 86, wire 87, wire 41. Therefore, the motor 120 keeps on operating until the cam 140 reaches the normal position shown in Figure 1, whereby the contact 143 is separated from contacts 141 and 144.

Before the end of the cycle and about the time the work-table has made one complete revolution, it is advantageous to speed up the work-table so that the arc, while it is dying away will not have an opportunity to burn the weld which was performed at the start of the welding cycle. This is accomplished by providing cam 113 with a relatively wide notch which permits the roller 112 to drop down into the notch 114 just before the end of one rotation of the work-table, thereby causing contact 110 to engage contacts 109 and 111 which completes a short circuit around the resistance 122 and increases the armature voltage, causing the motor speed to increase.

While the apparatus for feeding the electrode 31 is not in itself a part of the present invention it will now be described since it is shown in combination with the other circuits. The mechanism for feeding the electrode 31 is shown in Figure 8, to be described later. For the present it is sufficient to say that this up-and-down movement is controlled by magnet coils 150 and 151. When magnet coil 150 is energized the electrode 31 is caused to move down; when magnet coil 151 is energized the electrode 31 moves up. This is accomplished by a differential gear mechanism under the control of these magnets 150 and 151, the mechanism being constantly driven during the welding cycle by an electric motor 160 controlled by the relay switch 43 through the following circuit: wire 40, contact 54, contact 53, contact 55, wire 161, motor 160, wire 162, line wire 41.

The magnets 150 and 151 are energized by an electro-magnetic device known as the differential gear controlling magnet 170 which comprises stationary magnets 171 and 172, and a movable electromagnet 173. The magnet coil 171 is set at a predetermined voltage which is read by volt meter 174. The preferred voltage, approximately 31 volts, can be adjusted by a variable resistance 175 which is connected with one end of the magnet 171 and switch contacts 176 and 177. In order to test the voltage applied at the coil 171, before the apparatus is started, the operator moves a switch contact 178 into engagement with contacts 176 and 179, thereby connecting the coil 171 across the line wires 40 and 41. During the running of the machine the contact 178 is moved into engagement with the contact 177 and the contact 180 which is connected by wire 181 with wire 56, so that the coil 171 will be under the control of the relay switch 43. The other stationary magnet 172 of the differential gear controlling magnet 170 is connected across the welding arc by a wire 182 and a wire 183. Wire 182 is connected between brushes 23 and 30, and the wire 183 is connected with wire 32. The movable magnet coil 173 surrounds a floating armature and a magnetizable metal, represented in the drawings by the line 184. This armature insulatingly supports at each end contacts 185 and 186. (Bar 184 connects contacts 185 and 186.) Contact 185 is adapted to make engagement with contact 187, and contact 186 with contact 188. Contact 185 is connected by a wire 189 with terminal 190 between 1200 ohms resistances 191 and 192 connected respectively by wires 193 and 194 with contacts 187 and 188. Wire 193 is connected by wire 193a with magnet 151 which is connected with wire 195. Wire 195 connects wire 41 with 120 ohm resistances 196 and 197 which are connected with wire 40 by wire 198. The center point 199 between the resistances 196 and 197 is connected with one end of the floating magnet coil 173; the other end of which is connected with contact 186. If the electrode 31 comes too close to the work and the arc becomes too short, then the resistance in the circuit of the magnet winding 172 will decrease and its field strength will increase whereupon the bar 184 will be moved toward the right to cause the contact 186 to engage the contact 188. When this occurs current will flow through the following circuit: wire 40, wire 198, resistance 197, wire 199, coil 173, contacts 186 and 188, then resistances 192 and 191, wire 193, magnet coil 151, wire 195 and wire 41. The coil 151 being energized will receive an impulse which will cause the electrode 31 to be moved upwardly, but this impulse is of short duration because the magnet 173 upon being energized polarizes the iron bar 184 thereby causing it to be moved to the left and separate the contact 186 from the contact 188. At the instant the separation occurs coils 151 and 173 are deenergized and the bar 184 depolarizes whereupon it moves again to the right under the influence of the magnets 171 and 172. Therefore, the device 170 acts as a vibrator because the intermittent closing of the contacts 186 and 188 takes place causing the magnet 151 to receive a series of impulses causing the electrode 31 to be moved upwardly by a sort of intermittent motion. When electrode 31 has been moved upwardly for such a distance that the arc resistance cuts down the current flow to the magnet 172, then the control by the device 170 ceases, and no more retraction takes place. As the welding continues the carbon electrode 31 is consumed and must be moved downwardly. In case the arc length is too great then the magnet winding 171 overbalances the magnet winding 172 and the bar 184 is moved to the left thereby causing contact 185 to engage contact 187. When this occurs the following circuit is completed: wire 40, contact 54, contact 53, contact 55, wire 161, magnet coil 150, wire 150a, contact 188, wire 194, resistance 192, wire 189, contact 185, bar 184, contact 186, winding 173, wire 199, resistance 196, wire 195, wire 41. This causes the magnet coil 150 to receive an impulse to feed the electrode 31 downwardly. The function of magnet coil 171 is to use its influence to effect the energization of the magnet 151 which causes the electrode 31 to move upwardly.

Figure 2:
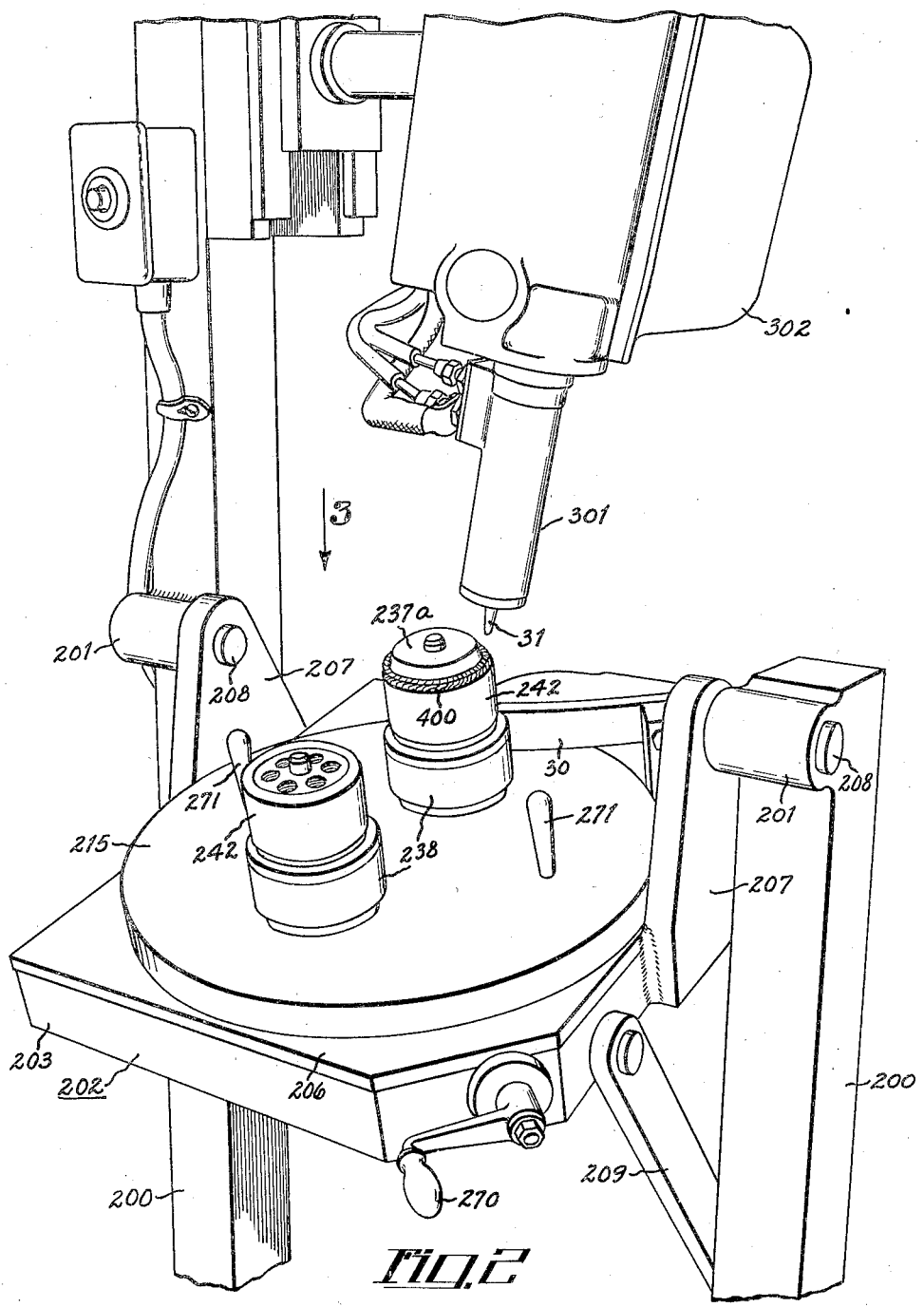
Fig. 2 is a perspective view of a portion of the welding apparatus used in the present invention showing the welding electrode.

Referring to Fig. 5, a support 200 is provided with apertured bosses 201 from which a table 202 is suspended. The table in the present instance, comprises a frame 203 provided with spider arms 204 which support a sleeve 205. A ring plate 206 is secured to the frame in any suitable manner. The table 202 is provided with side arms 207 whose upper ends are pivoted in the bosses 201 by suitable pins 208 so that the table 202 can be adjusted in various positions relative to the support 200 by a pair of braces 209, one end of the braces being connected to the frame 203 and the other end of the braces is attached adjustably to the support 200 by a bolt 210 extending through an elongated slot 211. The table is preferably tilted as indicated in Fig. 2 so that during the welding operation, a rotor or member to be welded will gradually go up-hill.

A disc 215 is rotatably supported on the table 200 by a shaft 216 journaled in ball bearings 218 and 219 located in counterbores provided by the sleeve 205. The disc is attached to the shaft 216 by a plurality of screws 219, one of which is shown in Fig. 5, having threaded engagement with a collar 220 provided by the shaft 216. Endwise movement of the shaft 216 relative to the sleeve 205 is prevented by a cap 221 attached to the lower end of the sleeve 216 by screws, not shown, the collar 220 resting on the bearing 218 and the bearing 219 resting on the cap 221.

The disc 215 supports a plurality of hollow bushings 230. Each bushing 230 is provided with an annular flange 231 to provide shoulders which rest on the top surface of the disc 215. A spindle 232 is provided with a collar 233 and is rotatably supported in ball bearings 234 and 235 within the bushing 230. The spindle 232 is prevented from endwise movement relative to the bushing 230 by a cap 236 attached to the lower end of the bushing 230 in any suitable manner, as by screws not shown, the collar 233 resting on the bearing 234 and the bearing 235 resting on the cap 236.

The collar 233 has a recess within which rests a pilot 237 for centering a work holder 238 having an annular flange 239 which contacts with the free end of flexible brush 30. The other end of the brush 30 is insulatingly supported by a bracket attached to the table 200 so that none of the welding current will pass through the welding fixture apparatus to increase the resistance thereof. The flange 239 extends over the flange 231. The work holder is attached to the collar 233 by screws 240, one of which is shown, see Fig. 5, so that the work holder will rotate with the shaft 232 and about the sleeve 231. A locating member 241 is carried by the work holder 238 and cooperates with the pilot 237 to properly position a rotor 242 on the work holder as shown in Fig. 2 to be welded. It will be readily understood that considerable saving in time of welding operation and in the current consumed can be obtained by heating the rotor assembly before it is placed upon the table 202.

A disc 237a of copper or other suitable metal is placed over the pilot 237 and against the rotor. The purpose of the disc 237a is to control the fluid molten copper during the welding operation so that when the metal solidifies the end ring formed on the end of the rotor will be in the proper place, and it will have the proper shape. This is accomplished by tilting the table 202 to the proper angle relative to the electrode 31 and rotating the work holder 238 in the correct direction of rotation. Referring to Fig. 2, the rotor is illustrated with the conductor ends 400 bent from right to left therefore the work piece and rotor in this instance should be rotated in a counterclockwise direction of rotation so that bent over ends of the conductors enter the high temperature arc first. As the rotor rotates the copper disc 237a, together with the proper angle of the rotor relative to the electrode 31 the impingement of the electrode stream forces the melted copper against the cold metallic disc 237a, together with gravity, due to the table angle and the location of the arc, the conductor wire is melted as it is running upward so that as the wire melts it flows toward the copper disc 237a in the center of the rotor. The disc also prevents the molten metal from spreading over the end of the rotor and maintains the molten metal within certain areas, thus providing for an end ring that is neat in appearance and of uniform thickness in cross section on the rotor end to give the required electrical characteristics.

The lower end of the spindle 232 carries the gear 243, having 58 teeth which intermeshes with the gear 133 having 65 teeth. The gear 133 is supported on the shaft 132 which is driven by the motor 120 through an arrangement of gears within the gear box 131. The lower end of the shaft 132 supports the gear 134 having 84 teeth which meshes with a gear 71a having 93 teeth. The gear 71a is supported on the shaft 71, see Fig. 3.

The gear box 131 and the motor 120 is supported in a fixed relation upon a U-shaped bracket 250. The arms of the bracket are attached to the lower side of the plate 206 by bolts 251 as shown in Fig. 5. The gear box is attached to the yoke 252 by bolts 253 while the motor 120 is suitably supported upon a table portion 254 formed integral on the yoke 252. Thus, when the table is tilted the motor 120 and gear box 131 will be simultaneously tilted.

A block 255 is suitably supported from the plate 206 and extends downwardly therefrom. This block is provided with a gear rack 256 which is adapted to alternately mesh with gears 243 and 243a. The reason for having two work holders is so that the operator can unload a welded rotor and place another rotor in position while a rotor is being welded.

Figure 4:
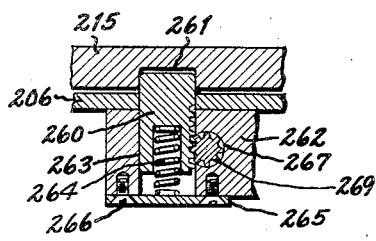
Fig. 4 is a sectional view taken on the line 4—4 of Fig. 3.

In order to prevent rotation of the plate 215 while welding the conductors of a rotor, a plunger 260 is adapted to register with one of two recesses 261 provided on the under side of the plate 215. The plunger 260 is slidably supported in a block 262 attached to the plate 202 in any suitable manner. The block 262 has a through opening 263 in alignment with an aperture in the plate 206. The plunger is provided with a recess on its lower side to house one end of a coil spring 264, the other end of the spring bearing against a plate 265 secured to the block 262 by screws 266. The spring urges the plunger into the recess 261, see Fig. 4. The block 262 is also provided with a transverse opening bore 267 which communicates with the opening 263, said bore forming a bearing for a shaft 268, one end of which is provided with a pinion 269 which intermeshes with the teeth provided by the plunger. A handle 270 is suitably secured to the outer end of the shaft 268 for actuating the shaft and the pinion 269 in a counterclockwise direction to withdraw the plunger from the recess 261 against the tension of the spring 264. When it is desired to adjust the plate 215 from one position to another or more specifically to rotate it 180°, the operator will turn the handle 270 so that the plunger 260 is withdrawn from the one opening 261 in the plate 215. He then grasps the handles 271 and rotates the plate. After the start of the rotation the handle 271 may be released for after being rotated from its one adjusted position the one opening 261 will be moved out of alignment with the plunger 260 and the plunger may then ride along the under surface of the plate 215. As soon as the plate 215 has been rotated 180° from its original position, the diametrically opposite recess 261 therein will align with the plunger 260 and the plunger may then enter this other opening 261 thus again locking the plate 215 in the newly adjusted position.

When the table 215 is rotated 180° the gear 243a will intermesh with the gear 133 and the gear 243 will mesh with the rack 256. As the plate 215 is rotated the plunger will bear against the underside of the plate so that when a recess is in alignment with the plunger the spring 264 will urge the plunger into the recess; thereby holding the plate 215 relatively stationary and maintaining the gear 243 in mesh with the gear 133 during the welding operation.

Figure 7:
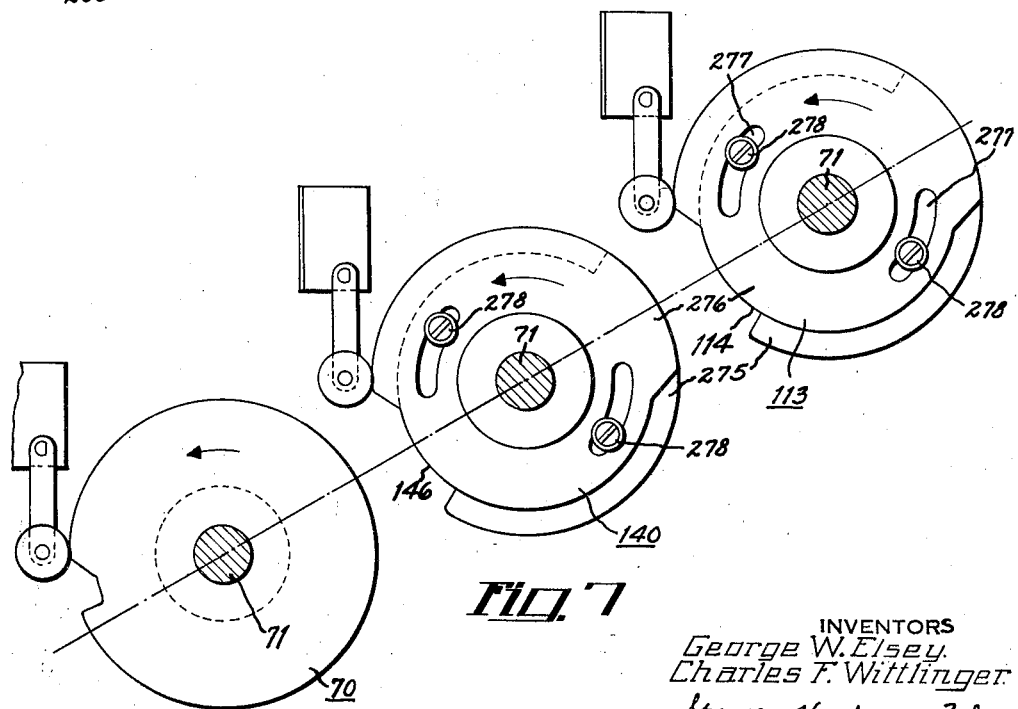
Fig. 7 is an enlarged showing of the cam members illustrating the relation of the cams in the normal position of the apparatus.

As stated heretofore, the shaft 132 supports the gear 134, see Figs. 3 and 5. Gear 134 intermeshes with gear 71a, see Fig. 3, which is supported on the end of the cam shaft 71 carrying the cams 70, 140 and 113. It will be noted, see Fig. 7, that the cams 140 and 113 are preferably made of two notched discs 275 and 276. The disc 276 is provided with arcuate slots 277 through which pass bolts 278 having screw threaded engagement with the disc 275. Thus, the disc 276 can be adjusted relative to the disc 275 to provide the proper notches 114 and 146 for the cams 113 and 140 respectively.

Referring to Fig. 8 the mechanism for manipulating the welding electrode 31 relative to the work to be welded comprises an electrode holder 300 extending into a head 301. The head is secured to a housing 302 which encloses the electrode feed mechanism apparatus. The mechanism for moving the electrode to and from the work so as to maintain the welding arc substantially constant will now be described. Since this construction of the mechanism is not in itself a part of the present invention the description thereof will be general.

The motor 160, which is of a usual construction is adapted to operate a chain of gears suitably supported in a gear casing 310. This chain of gears operates a worm, not shown, which meshes with a worm gear 312, shown in Fig. 8. The gear 312 is keyed to a sleeve 313 which is located about the upper portion of the electrode holder 300. The sleeve 313 is journaled in bearings 314 and 315 suitably supported within the housing 310. Beveled gears 316 and 317 are loosely supported on the sleeve 313 and restrained against axial movement toward each other by abutments provided intermediate the ends of the sleeve. The sleeve 313 carries a stub shaft 318 which is supported by a bracket 319 removably secured to the sleeve 313. A beveled pinion 320 is rotatably supported on the shaft 318 and meshes with both gears 316 and 317. A pinion 321 fixed to and rotatable with the spur gear meshes with a pinion 322 keyed to a shaft 323 which is rotatably supported in the sleeve 313 which carries a driving pinion 324 which meshes with arc rack 325 formed on the other surface of and extending axially of the electrode holder 300. Each of the gears 316 and 317 is provided with a wearing ring 326 adapted to be engaged by brake shoes 327 and 328 shown in Fig. 10.

The brake shoes 327 and 328 are carried by arms 329 and 330 respectively and are provided with an armature 331 and an electromagnet 150 and 151. Energization of the electromagnet 150 will attract the armature 331 thereto and cause a braking of the particular gear 316 or 317. The arms 329 and 330 are suitably supported and pivoted on a shaft 340 carried by the casing. The brake shoe supporting arms 329 and 330 are adjustable relative to the gears 316 and 317 and to each other by set screws 341 and 342.

The operation of the mechanism for controlling the electrode will now be briefly described. In connection with the welding circuit the magnet 170 with windings 171 and 172 is employed to supply current to the magnets 150 and 151 respectively of the electromagnetic brakes associated with the gears 316 and 317 as the arc voltage varies to either side of a predetermined value. The motor 160 through the gear arrangement in the gear box 310 rotates gear 312 at a uniform speed to cause the rotation of the electrode 31 and the gears 316 and 317 and the pinion 320. When the arc voltage varies due to the variation in the length of the welding arc from a predetermined value, the relay will supply current to one or the other of the electromagnetic brakes associated with the gears 316 and 317 so that one of said gears will be braked against rotation. When one of the gears 316 and 317 is braked against rotation, the continued rotation of the sleeve 313 will effect the rotation of the pinion 320 causing the gear 324 to be rotated to move the electrode toward or away from the work. This movement of the electrode will continue until the condition, which caused the energization of one of the coils 150 and 151 through the magnet 170, has been corrected, whereupon the particular coil will be deenergized and the arc maintained at the proper length until a further change in the arc length occurs, which will be effected through the magnet 170 in a braking of a particular one of the gears 316 and 317. The direction of rotation of the pinion 321 depends upon which gear 316 or 317 is braked and hence the electrode 31 will be fed axially either toward or away from the work so that the arc length is maintained constant.

While the embodiment of the present invention as herein disclosed, constitutes a preferred form, it is to be understood that other forms might be adopted, all coming within the scope of the claims which follow.

What is claimed is as follows:

1. In an arc welding apparatus, the combination with a welding electrode; a work holder for locating relative to the electrode a rotor to be welded; motor actuated means for effecting rotation of the workholder at a definite rate of speed; a welding circuit; a motor circuit; a normally open switch connected in the motor circuit; and means actuated by the operation of the motor to close the switch to alter the motor circuit for increasing the motor speed and for concurrently increasing the speed of the rotor past the electrode prior to the opening of the welding circuit.

2. In an arc welding apparatus the combination with a welding electrode, a work holder for locating relative to the electrode a rotor to be welded; motor actuated means for effecting rotary movement to the workholder; a welding circuit; a motor circuit; a resistance in the motor circuit; a switch; cam means for normally holding the switch in open position; gear means responsive to the operation of the motor to rotate the cam means during the welding cycle, said switch and cam means having provisions cooperating with each other to cause the closing of the switch to short circuit the resistance thereby causing the speed of the motor to be increased and the speed of the rotor to be increased past the electrode prior to the opening of the welding circuit.

3. In an arc welding apparatus the combination with a welding electrode, a holder for locating a member relative to the electrode; gear means for rotating the member relative to the electrode; a motor for operating the gear means; a welding circuit; a motor circuit; a manually operable switch; electrically actuated means for closing the welding circuit upon closure of the manual switch; means responsive to the closing of the welding circuit for closing the motor circuit to drive the gear means; cam means driven by the gear means; and a switch controlled by the cam means for controlling the motor circuit whereby the motor will be operated at different speeds and cause the member to be rotated at different speeds past the electrode.

4. In an arc welding apparatus the combination with a welding electrode; a work-holder for locating a rotor to be welded; gear means for effecting rotary movement to the work holder and rotor; a motor for driving the gear means; a welding circuit; a motor circuit; a resistance connected in the motor circuit; switching means for closing the welding circuit; switching means responsive to the closing of the welding circuit to close the motor circuit whereby the motor will operate the gear means to rotate the work holder more than a complete cycle; cam members driven by the motor; a plurality of switches controlled by the cam members, one of the switches being normally closed and others normally open, said cams and switches having provisions whereby the open switches are closed and the closed switch opened near the end of a cycle, the closing of one of the normally open switches short circuiting the resistance thereby causing the speed of the motor to increase while another switch maintains the motor circuit closed prior to the opening of the normally closed switch, the opening of said last mentioned switch causing the welding circuit to be opened, while continued movement of the cam members returns all of the switches to their normal position simultaneously to open the motor circuit.

5. In an arc welding apparatus the combination with a welding electrode; a work holder for locating a work-piece; gear means for rotating the work past the electrode; a welding circuit; a motor for driving the gears; a circuit for the motor; means connected in the motor circuit and effective near the end of the welding cycle to alter the motor circuit whereby the speed of the motor increases just before the welding circuit is opened to prevent the finishing weld from burning the weld at the start; and switching means for plugging the motor circuit.

6. In an arc welding apparatus the combination with a welding electrode; a work holder for locating relative to the electrode a piece of work; gear means for rotating the holder so that the work will be rotated past the electrode; a motor for driving the gear means; a welding circuit; a motor circuit; a plurality of cams; a second set of gears adapted to be rotated upon rotation of the first set of gears to rotate the cams for one complete cycle; a plurality of switches controlled by the cams; a manually operated switch interconnected with electro-responsive devices for closing the welding circuit and the motor circuit progressively, the closing of the motor circuit effecting rotations of both sets of gears and the cams, each switch being operated by an independent cam and actuated from their normal positions prior to the completion of the cycle of the cams whereby one of the cam operated switches is closed to maintain the motor circuit, another to alter the motor circuit to increase the speed of the motor while another switch is opened after the last mentioned switch is closed to open the welding and motor circuits.

7. In an arc welding apparatus the combination with a welding electrode, a work-holder for properly locating a rotor to be welded relative to the electrode; gears for effecting rotation of the rotor past the electrode and to cause the rotor to be rotated more than one revolution; a welding circuit; a motor circuit; a resistance connected in the motor circuit; a plurality of cams; another set of gears mounted to be rotated with the first mentioned gears and adapted to rotate the cams a complete revolution; and a plurality of switches actuated by the cams at the completion of the revolution of the rotor, said cams and switches having provisions cooperating with each other near the completion of the revolution of the cams to close a pair of normally open switches, one of the switches being closed to maintain the motor circuit and another switch being closed to short circuit the resistance in the motor circuit thereby increasing the speed of the motor prior to the opening of a normally closed switch to open the welding circuit the motor circuit being opened on completion of the revolution of the cams.

8. In an arc welding apparatus the combination with a welding electrode; a work-holder for locating relative to the electrode a rotor to be welded; gear means for effecting rotation of the rotor past the electrode; a welding circuit; a motor circuit; a manually actuated switch; means responsive upon closure of the manual actuated switch for closing the welding circuit; electrical means responsive to the closing of the welding circuit to connect the motor circuit with a power line; a second set of gears for effecting rotation of a plurality of cams; a drive connection between the motor and the first set of gears to operate both sets of gears; a pair of normally open switches and a normally closed switch actuated by the cams near the completion of one revolution of the cams, said cams operating to first close the open switches one of the switches maintaining the motor circuit connected with the power line and the other switch altering the circuit of the motor to increase the speed of the same prior to the opening of the normally closed switch whereby the welding circuit is opened, the motor circuit being opened upon completion of the revolution of the cams.

9. In an arc welding apparatus, the combination with a rotatable electrode; a work holder for locating relative to the electrode a rotor to be welded; motor actuated means for rotating the work holder for moving the rotor past the electrode; a welding circuit; a motor circuit; electrically actuated means responsive after a predetermined length of time to the closing of the welding circuit to close the motor circuit to operate the motor for effecting rotation of the motor actuated means; cams mounted to rotate upon operation of the motor; and a plurality of switches for controlling the motor circuit and the welding circuit actuatable by the cams near the end of the welding cycle, one of the switches being actuated to alter the motor circuit for increasing the speed of the motor and simultaneously increasing the speed of the rotor past the electrode, a second switch actuatable after the first mentioned switch to maintain the motor circuit closed and a third switch actuatable to open the welding circuit prior to the opening of the second mentioned switch to plug the motor circuit.

10. In an arc welding apparatus, the combination with a rotatable electrode; a work holder for locating relative to the electrode a work piece to be welded; motor actuated means for effecting rotation of the work holder; a welding circuit; a motor circuit; means responsive to the voltage of the welding circuit for closing the motor circuit; a pair of normally open switches connected in the motor circuit and a normally closed switch; and rotatable means for automatically actuating the switches, said means operating to first close one of the open switches after a predetermined rotatable movement of the work to alter the motor circuit to increase the speed of the motor and the speed of the work piece past the electrode and then closing the other open switch for maintaining the motor circuit closed before the normally closed switch is opened to open the welding circuit whereupon continued movement of the rotatable means causes all of the switches to return to their normal positions causing the motor circuit to be plugged to stop the motor.

11. In an arc welding apparatus the combination with a welding electrode; a work holder for locating relative to the electrode a rotor; motor actuated means for effecting rotation of the work holder; a welding circuit; a motor circuit; a resistance connected in the motor circuit; a normally open switch; means actuated by the operation of the motor to close the switch to short circuit the resistance thereby increasing the motor speed and concurrently increasing the speed of the rotor past the electrode; and switching means for opening the welding circuit and the motor circuit soon after the speed of the motor has been increased.

12. In an arc welding apparatus the combination with an electrode; a work holder for locating a rotor; motor actuated means for effecting rotation of the work holder; a welding circuit; means responsive to the closing of the welding circuit to close a motor circuit; a pair of normally open switches; means actuated by the operation of the motor to close one of the switches to maintain the motor circuit and close another switch whereby the motor circuit is altered to increase the speed of the motor and to increase the speed of the rotor past the electrode; and switching means for opening the welding circuit prior to the opening of the first mentioned switches to open the motor circuit.

13. In an arc welding apparatus the combination with a welding electrode; means for locating a work piece; means for rotating the work past the electrode; a welding circuit; a motor for actuating the rotating means; a motor circuit; switching means for closing the welding circuit; switching means responsive to the closing of the welding circuit to close the motor circuit; and means connected in the motor circuit and effective near the end of the welding cycle to alter the motor circuit to increase the speed of the motor prior to the opening of the welding circuit.

14. In an arc welding apparatus, the combination with a welding electrode; means for supporting a member to be welded; motor actuated means for effecting movement of the member past the electrode at a definite rate of speed; a welding circuit; a motor circuit; switching means for closing the welding circuit; switching means responsive to the closing of the welding circuit to close the motor circuit; a normally open switch connected in the motor circuit; means for closing the switch after the motor circuit is closed a predetermined length of time to alter the motor circuit to increase the speed of the motor; a second normally open switch; and means for closing the second mentioned switch prior to the opening of the welding circuit to maintain the motor circuit a short time and for opening said switch whereby the second mentioned switching means is actuated to plug the motor circuit.

15. In an arc welding apparatus the combination with a welding electrode; a work holder for locating relative to the electrode a rotor to be welded; motor actuated means for effecting rotation of the holder at a definite rate of speed; a welding circuit; a motor circuit; a pair of normally open switches; means actuated by the operation of the motor to close one of said switches to alter the motor circuit to increase the speed of the motor and to close the other switch to maintain the motor circuit closed prior to the opening of the welding circuit; and switching means for plugging the circuit shortly after the welding circuit is opened.

16. In an arc welding apparatus the combination with a welding electrode; a work holder for locating relative to the electrode a member to be welded; motor actuated means for effecting rotation of the workholder at a definite rate of speed; a welding circuit; a motor circuit; a resistance in the motor circuit; a normally open switch connected in the motor circuit; means operable by the motor to allow the switch to close near the end of the welding cycle and short circuit the resistance causing the speed of the motor to be increased prior to the opening of the welding circuit; and switching means for plugging the motor circuit after the welding circuit is opened.

17. In an arc welding apparatus the combination with a movable electrode; a work holder for locating relative to the electrode a member to be welded; motor actuated means for effecting movement of the work holder at a definite rate of speed; a welding circuit; a motor circuit; a mercury switch and an electro-magnetic switch responsive to the closing of the welding circuit to close the motor circuit to operate the motor for effecting operation of the motor actuated means; a normally open switch connected in the motor circuit; and means actuated by the operation of the motor to close the switch and alter the motor circuit for increasing the motor speed and for concurrently increasing the speed of the member past the electrode prior to the opening of the welding circuit.

18. In an arc welding apparatus the combination with a movable electrode; a work holder for locating relative to the electrode a member to be welded; motor actuated means for effecting movement of the work holder at a definite rate of speed; a welding circuit; a motor circuit; a pair of electrical devices responsive to the closing of the welding circuit to connect the motor circuit with a power line to operate the motor for effecting operation of the motor actuated means; a normally open switch connected in the motor circuit; a second normally open switch connected between the pair of electrical devices; and means operable upon rotation of the motor to close the switches, the closure of the first mentioned switch altering the motor circuit to increase the speed of the motor and the movement of the member past the electrode while the closure of the second mentioned switch connects one of the electrical devices with the power line to maintain the motor circuit closed prior to the opening of the welding circuit and upon opening of the last mentioned switch the last mentioned electrical device will be actuated to plug the motor circuit.

19. In an arc welding apparatus the combination with a movable electrode; a member to be welded; a motor for effecting movement of the member past the electrode at a definite rate of speed; a welding circuit; a motor circuit; switching means responsive to the closing of the welding circuit to close the motor circuit to operate the motor and cause the member to be moved at a definite rate of speed; means effective after a predetermined length of time after the motor is started to alter the motor circuit to increase the speed of the motor and the movement of the member past the electrode; and means for plugging the motor circuit shortly after the alteration of the motor circuit.

20. In an arc welding apparatus the combination with a movable electrode; a member to be welded; a motor for effecting movement of the member past the electrode at a definite rate of speed; a welding circuit; a motor circuit; a manually operated switch; switching means responsive to the closure of the manual switch to close the welding circuit; electrical devices responsive after the closure of the welding circuit to close the motor circuit and cause the motor to be actuated to move the member past the electrode at a certain rate of speed; a pair of normally open switches, one of the switches being actuated to a closed position at the expiration of a predetermined time after the motor circuit is closed to alter the motor circuit to increase the speed of the motor, a second switch actuatable to a closed position after closure of the first mentioned switch to maintain one of the electrical devices engaged to keep the motor circuit closed after the welding circuit is opened, the opening of the second mentioned switch causing said electrical device to plug the motor circuit.

21. A method of forming swedged conductor ends into a continuous end ring for a rotor core, comprising the steps which include, placing a heat absorbing disc within the boundaries of the conductor ends, positioning the core at an acute angle with the vertical, rotating the core, and then applying heat to the conductor ends which are at the highest point whereby the conductor ends melt and the molten metal gravitates toward the disc.

22. A method of forming swedged conductor ends into a continuous end ring for a rotor core, comprising the steps which include, supporting the core at an acute angle with the vertical, placing a copper disc within the boundaries of the conductor ends, rotating the core, and then applying heat to melt the conductor ends at a point whereby the molten metal gravitates toward the disc and whereby the molten metal is prevented by the disc from spreading beyond a certain area on the end of the rotor core.

23. A method of forming adjacent conductor ends into a continuous end ring for a rotor core, comprising the steps which include, supporting the core at an angle with the vertical, positioning a metal member within the confines of the conductor ends, rotating the core so that the conductor ends pass an electric arc to melt the ends whereby the molten metal gravitates toward the disc and thereby providing an end ring of substantially uniform cross section.

24. A method of forming adjacent conductor ends in a continuous end ring for a rotor core, comprising the steps which include, supporting the core at an acute angle with the vertical, positioning a metal member adjacent the core and within the confines of the conductor ends, rotating the conductor ends past heat means to melt the conductor ends whereby the molten metal gravitates toward the center of the core end and against the metal member and thereby providing a continuous end ring of substantially uniform cross section.

25. A method of forming swedged conductor ends into a continuous end ring on a rotor core, comprising the steps which include, supporting the core at an acute angle with the vertical, positioning a metallic member within the boundaries of the conductor ends so that it will bear against the end of the rotor core, rotating the core past an arc whereby the molten metal gravitates toward the metallic member and thereby providing a continuous end ring of substantially uniform cross section.

GEORGE W. ELSEY.
CHARLES F. WITTLINGER.